March 17, 1970
C. P. WARMAN
3,500,764
MECHANISM FOR TRANSFERRING LOADS THROUGH
TENSIONED, CONTROLLED CABLES
Filed Feb. 19, 1968
4 Sheets-Sheet 1
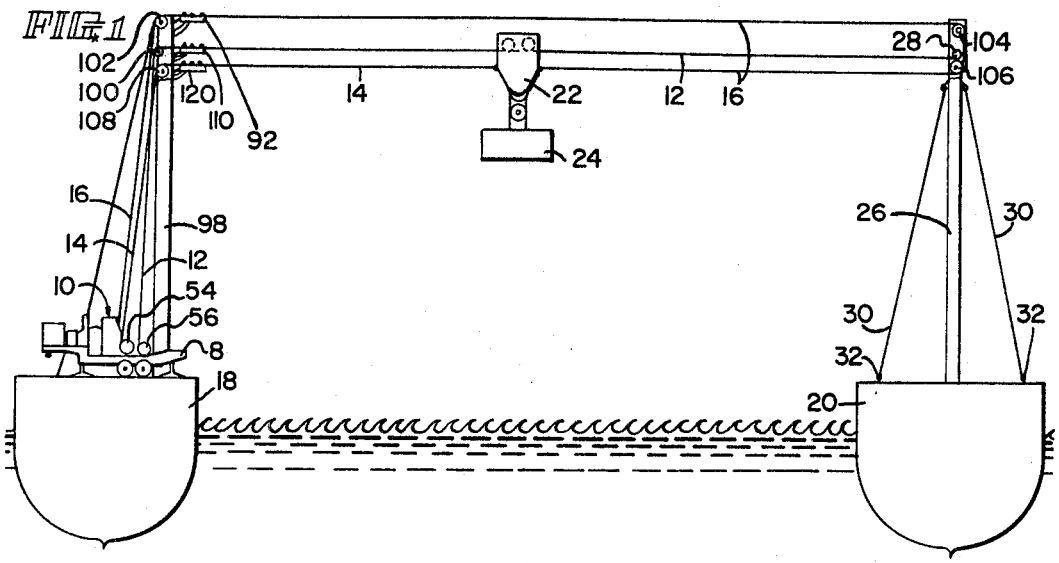
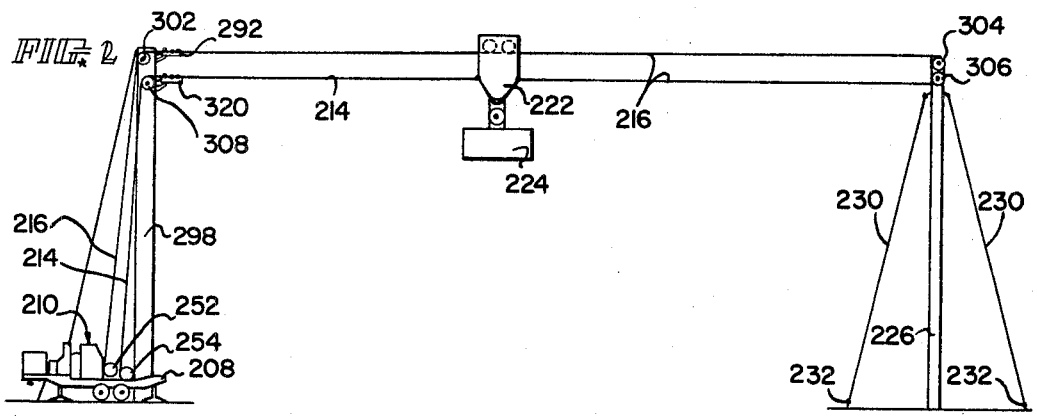
CHARLES P. WARMAN
INVENTOR.
BY
HIS AGENT

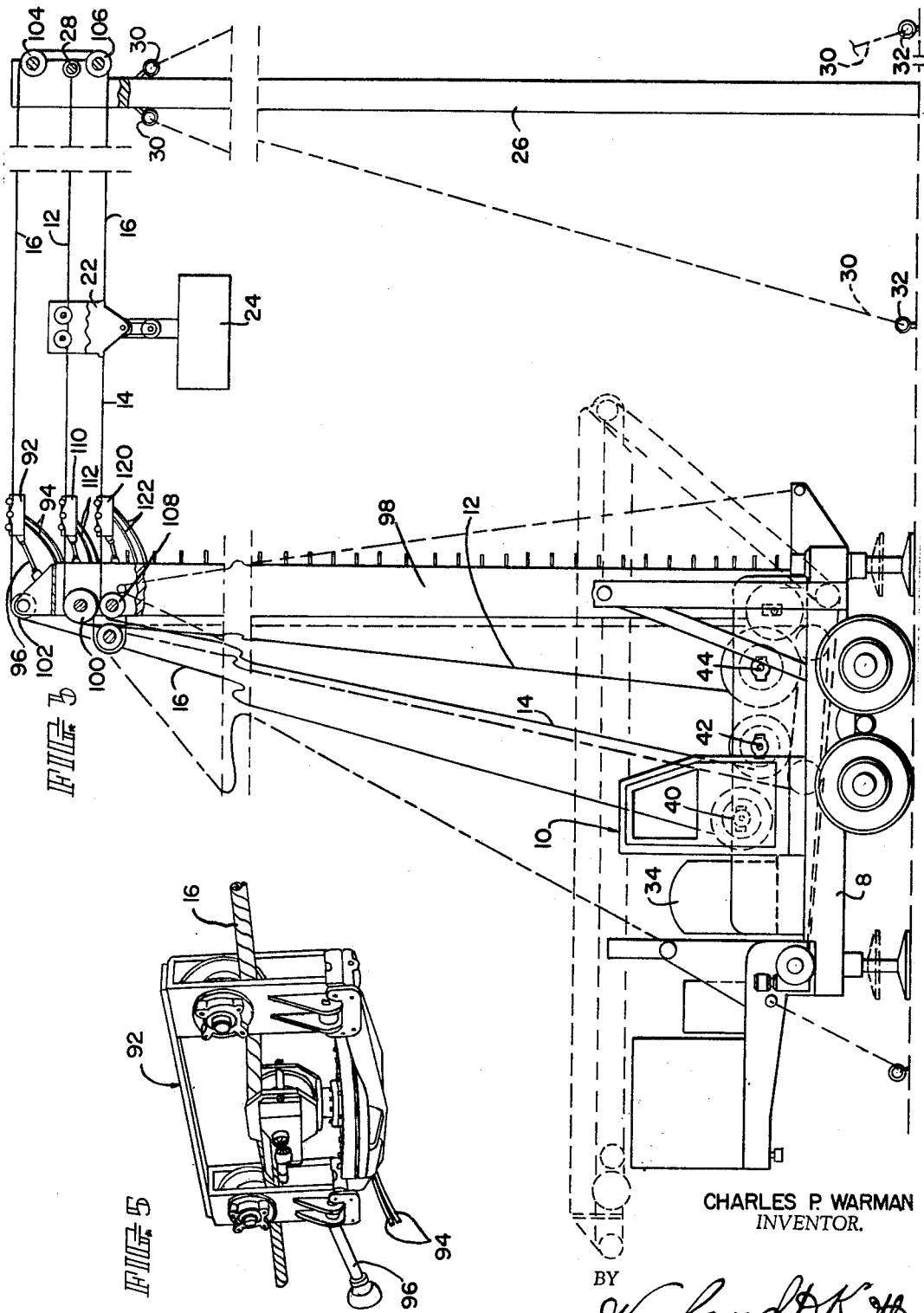

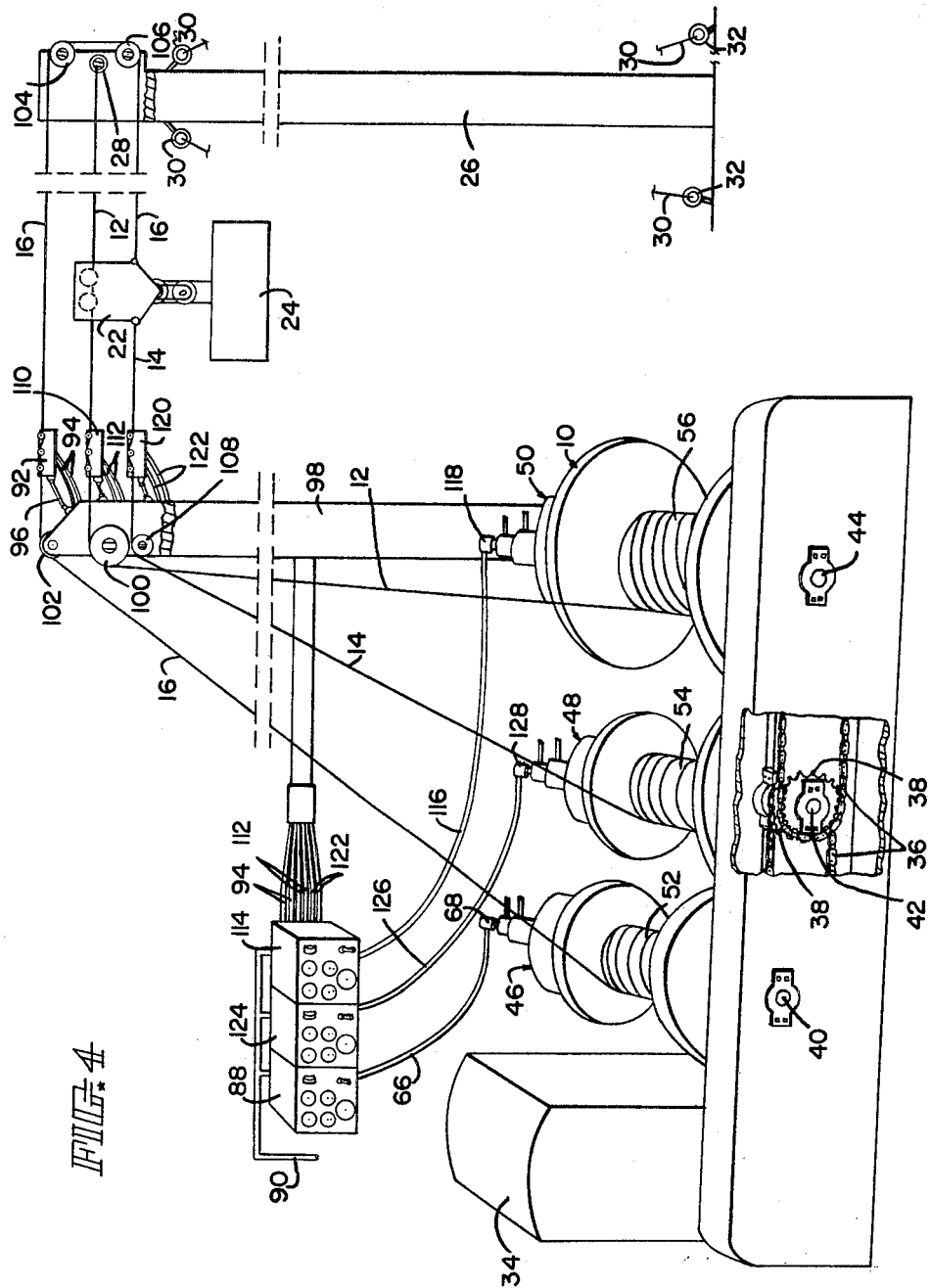

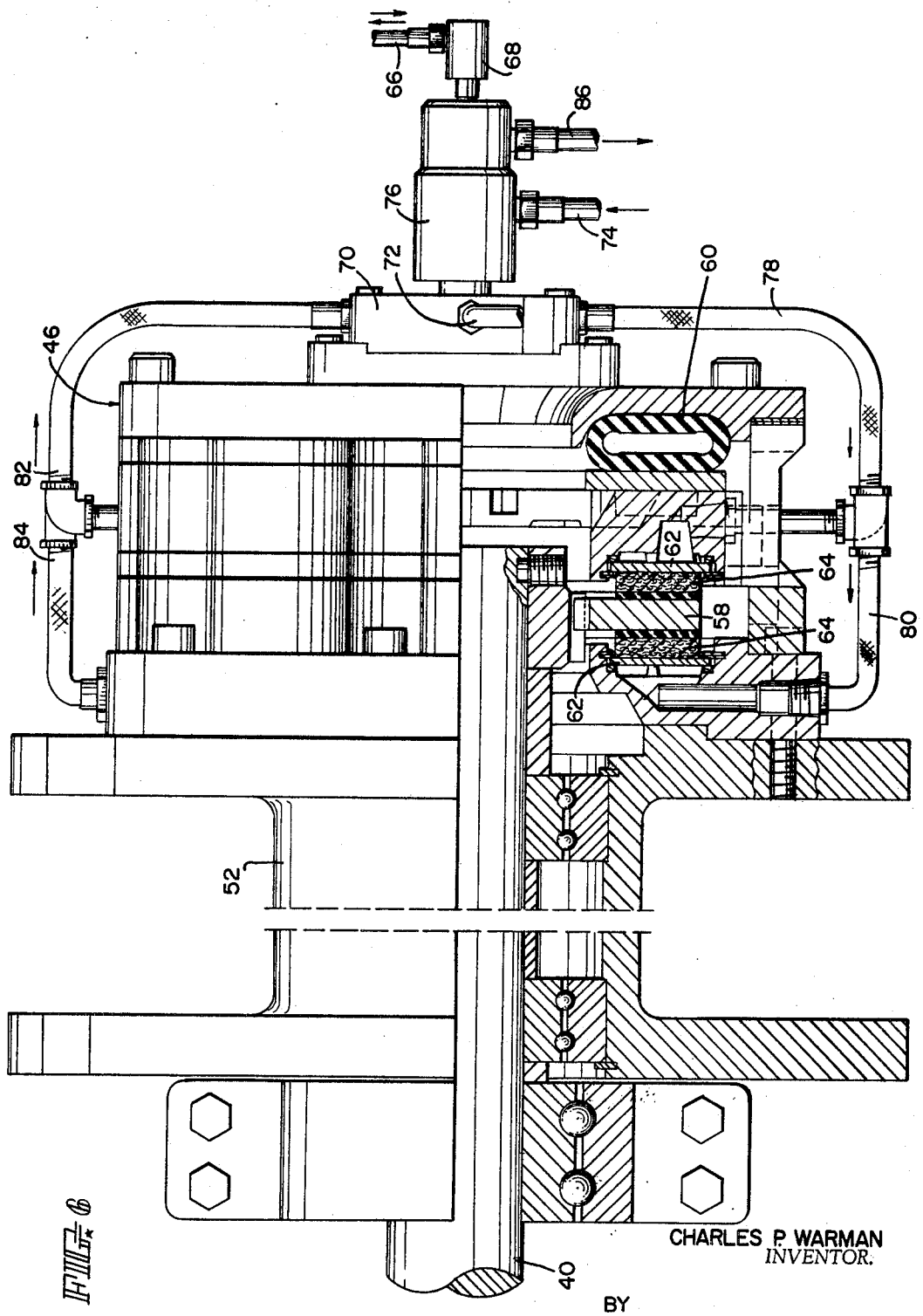

United States Patent Office 3,500,764
Patented Mar. 17, 1970

3,500,764
MECHANISM FOR TRANSFERRING LOADS THROUGH TENSIONED, CONTROLLED CABLES
Charles P. Warman, Wichita Falls, Tex., assignor to Wichita Clutch Company, Inc., Wichita Falls, Tex.
Filed Feb. 19, 1968, Ser. No. 706,575
Int. Cl. B61b 7/02
U.S. Cl. 104—114                         8 Claims

ABSTRACT OF THE DISCLOSURE

A system for maintaining a lineal element, such as load transfer cables, at a constant tension to enable the transfer of a load, such as parcels, cargo, or the like, from one station to another, even though one or both stations are relatively movable. Provision is made to maintain constant tension on winch lines, to enable the transfer of loads between two fixed stations, between a ship at sea and a stationary loading dock, or between two ships at sea, which are relatively movable, by utilizing a continuously rotating, slipping clutch, which clutch is continuously cooled by circulating a fluid media therethrough to maintain the friction elements therein at a temperature below which the friction elements would become damaged.

---

This invention relates to improvements in ship to ship, or ship to shore cargo transfer systems and more particularly to a cargo transfer system which maintains constant tension on the support lines therebetween and a constant tension on a winch line which moves the cargo from ship to ship, or from ship to shore.

The art of extending lines between ships or lines between a ship and a stationary object on shore has long been practiced, but, due to the erratic movement of a ship or ships, the looseness or tautness of the lines caused by such movement, due to action of the waves thereagainst which causes a ship to roll, makes the use of such transfer lines undesirable unless these can be maintained at a constant tension at all times.

Various attempts have been made to perform this function, such as shown in the patents to Shillinger, Jr. No. 3,217,660 and Born et al. No. 3,361,080.

The present invention utilizes a system of maintaining all lines, utilized in the present system, at a constant tension under all conditions, to take up a given amount of slack within the line or lines, which, after the given amount of slack has been exhausted, as used in some devices heretofore, the cables become loose of the cables and the system have to be re-tightened and re-oriented.

With the present system, however, the support cable and both the "in-haul" and the "out-haul" cables may be maintained at uniform, constant tension at all times for the full length of the extended cables, whether the ships are brought into side by side relation, or a ship is brought into adjacent relation with the stationary transfer station, even though the waves cause the ships to roll in opposite directions, as this roll, pitch, or separation of the ships becomes less or greater, the cable will be reeled in, or payed out rapidly to fully compensate for such movement.

The present arrangement provides for a separate winch drum for each line used, with a clutch connected thereto, each which winch drum is driven through a clutch in such manner that the winch drum will always have a tendency to wind the cable thereonto, however, the clutch is normally slipped and the drive element is driven at a speed as fast as, or in excess of the maximum revolution at which the winch drum is ever expected to reel in cable.

An automatic sensor is associated with each winch line so that at any greater tension, other than the pre-set constant tension, the clutch will slip more, if the cable is being payed out, to enable the clutch to maintain the constant tension. The automatic sensor device will cause a greater degree of engagement of the interengaging cluch elements which will result in less slippage to drive the winch drum to reel in the cable, if the tension on the cable is not as great as that at which the automatic sensor has been set to pre-tension the cable.

Each clutch becomes a dynamic brake, when the drums of the respective winches are rotated in the direction opposite the normal direction of rotation, by interengaging the clutch elements to a predetermined degree in accordance of the demand of a sensor associated with the cable.

While the invention has been primarily mentioned with respect to transfer a load, such as a cargo or parcels from ship to ship, or ship to shore, it is to be understood that the present cable tensioning arrangement to maintain a constant tension on a cable, is readily applicable to two spaced apart stations not associated with ships, such as maintaining a constant tension on a tram line to haul a load across inaccessible places, such as a canyon, a timbered area, or the like. While the present device primarily shows the use of three cables extending between spaced apart stations, with one cable being a tensioned support cable, two cables may be used between stations, thereby dispensing with the support cable, with the load being supported either by the "in-haul" or the "out-haul" cable, or supported therebetween.

The present slip clutch is fluid cooled and utilizes the cooling system as shown in my co-pending application for Patent Ser. No. 556,793, filed May 6, 1966 for Heat Dissipating Clutch or Brake With a Peripherally Pivoted Planar Wear Plate for Expansive Movement in a Coextensive Plane now patent No. 3,435,936, wherein the fluid circulated therethrough dissipates the heat generated by the friction elements of the clutch so that the clutch may slip continuously without damage thereto or to the friction elements associated therewith, as the heat is dissipated so the temperature will not be raised to a degree beyond that at which the clutch will operate efficiently.

The controls of the present device, for maintaining the cables at a constant tension may be of a character as shown in the patent to Art I. Robinson, No. 3,289,967, issued Dec. 6, 1966, Tension Regulator, which cable sensing device is associated with a cable tension measuring device comprising three sheaves on the cable being tensioned, one of which sheaves is associated with a valving mechanism, which valving mechanism is connected with the sensor control unit which controls the pressure from a fluid supply line to a fluid actuated clutch so as to enable the fluid actuated clutch to be engaged or released in accordance with the pre-set cable sensing device.

The tensioning of the present cables utilizes a clutch system and cable tension control similar in character to the arrangement shown in the co-pending application of Charles P. Warman and Jack W. Moss, Ser. No. 687,538, filed Dec. 4, 1967, for Mechanism for Maintaining Constant Tension.

An object of this invention is to provide a system for maintaining a constant tension on a winch line or lines to enable a load to be accurately and safely transferred between elevated stations by a cable.

Still another object of the invention is to provide a winching system which will maintain a constant tension on one or more cables to enable the transfer of a load between a ship and a fixed station remote from the ship.

Still a further object of the invention is to provide a load transfer system between two ships at sea, without either of the ships having to be anchored, and with provision being made for reeling in or paying out cable to compensate for the varying distance between the ships, or for motion caused by erratic movement thereof brought about by turbulent seas.

Another object of the invention is to provide a mechanism whereby a clutch is slipped to pay out or reel in cable for the entire length of the cable, without having to readjust the cable tensioning means for an undue amount of slack.

Yet another object of the invention is to provide automatic, constant tensioning of the cables between stations, either on land or at sea, without the necessity of personnel having to tighten or loosen the winch lines.

A still further object of the invention is to provide a continuously slipping, fluid cooled clutch, which clutch is capable of being driven as fast as, or faster than the maximum speed at which a winch drum connected thereto is to be driven to reel cable thereonto and which clutch is capable of being slipped to enable the cable to be payed out to maintain the cable at a constant tension by a constant tension cable sensing device.

With these objects in mind and other which will become manifest as the description proceeds, reference is to be had to the accompanying drawings on which like reference characters designate like parts in the several views thereof, in which:

FIG. 1 is an elevational view showing two ships, with one form of transfer system extending therebetween, showing the winch mechanism mounted on one ship;

FIG. 2 is a modified form of the cable transfer system extending between two stations, which may either be located on ships or on stationary locations, showing two lines as utilized for the transfer of articles between the stations;

FIG. 3 is an enlarged side elevational view of a winching mechanism mounted on a trailer, showing a load transfer system, including the mast of the winching mechanism in full outline in upright position, and showing an upright standard on a complementary station a spaced distance therefrom, the load carrying cable being shown as extending therebetween, and showing the "in-haul" and "out-haul" cables positioned around sheaves on both the upright standard and the upright mast, showing a trolley associated with the cables, with a load suspended therebelow, the lowered position of the mast being shown in dashed outline, with parts being broken away and shortened;

FIG. 4 is an enlarged view, partly in perspective, of winching and power drive mechanisms shown apart from the trailer, with parts broken away, and with parts shown in section, and showing the cables extending outward from the winches of the winching mechanism, over the mast and connected to the upright standard, showing a load supported on the cables intermediate the mast and the standard, and showing, diagrammatically, the cable tension sensing devices and the cable sensing control units associated therewith and with the source of air supply, with conduits being shown as leading from the sensing control units to the cable sensing control devices on the respective cables being tensioned and showing air lines leading to the respective clutches for operating the respective winch drums;

FIG. 5 is an enlarged, perspective view of the cable sensing device installed on a cable; and FIG. 6 is an enlarged fragmentary view of one of the winches and of one of the continuously slipping clutches associated therewith, with parts shown in elevation and with parts broken away and shortened to bring out the details of construction.

With more detailed reference to the drawing, the numeral 8 designates generally a base or trailer unit for mounting the winching mechanism, which is designated generally by the numeral 10. While the present unit is shown as mounted on a trailer for portability, it is to be understood that this is considered as a base, whether movable or stationary. The winching mechanism 10, and the cables associated therewith, have constant tension control mechanisms associated therewith to maintain support cable 12, "in-haul" cable 14 and "out-haul" cable 16 at a constant tension between ships 18 and 20, or between other spaced apart stations so a trolley 22 may transfer loads 24 from one ship to another, as will best be seen in FIGS. 1, 3 and 4, or as shown in a modified form of the invention, from one station to another, as shown in FIG. 2.

The form of the winch mechanism, as illustrated in FIGS. 1 and 3 through 6, embodies a system which utilizes three cables between two elevated stations such as between the upper portions of an upright standard 26 and the upper portion of a mast 98 of ships or a ship to shore station, or two elevated stations on the land, with cable 12 being used solely to support the trolley 22 and the load 24 carried thereby, with the cable 12 being anchored to the upright standard 26 by an anchor member 28, which upright standard 26 is maintained in upright position by guy wires 30 which are attached to standard 26 and to an anchor member 32.

The winch mechanism 10, which, in the present instance, includes a power drive unit 34 and multiple chains 36 connected thereto in driving relation, to drive several sprockets, which are indicated generally by the numeral 38, which chains 36 are connected with the power unit 34 so as to rotate shafts 40, 42 and 44 in a direction so that, when the respective clutches 46, 48 and 50 are engaged, the winch drums 52, 54 and 56 will be rotated in the direction to wind cable thereonto. The winch 56 will wind the support cable 12 thereonto, which cable is wound onto the drum of the winch until clutch 50 slips, and since the clutch is set to slip continuously at a predetermined tension, the cable 12 will be maintained at this tension as long as required.

All of the winch mechanisms, 52, 54 and 56 and the clutch mechanisms 46, 48 and 50, are of the general character as shown in FIG. 6, with each varying in size or pull capacity in accordance with the load which the winch is to handle. The enlarged view of the clutch 46, together with winch 52, as shown in FIG. 6, is representative of clutch unit 48 and winch 54 and clutch unit 50 and winch 56. The winch and clutch unit 48–54 utilizes a power driven shaft 40 which is connected in driving relation with clutch plate 58, which shaft and clutch plate are driven continuously through drive chains 36 by power unit 34. The present clutch is shown to be an air actuated clutch, having an axially expansible, elastomer tube element 60 therein, which element, when expanded, moves clutch wear plate 62 into binding engagement with friction elements 64, on clutch plate 58, to a degree proportionate to the tension at which it is desired to engage clutch 46 to rotate winch drum 52 or tend to rotate winch drum 52, or tend to hold winch drum 52 against retrogression, when the cable 16 is being payed out.

Air, under pressure, is admitted into clutch 46 through a conduit 66 into the stationary portion of rotary fluid seal 68 which passes air therethrough and into a passage within the axially rotatable member therein and into distributor ring 70, which ring 70 rotates with the clutch 46. The air is then passed out through conduit 72, which connects with the axially expansible, elastomer tube 60 in a manner well understood in the art of air clutches, and which is more fully brought out in the co-pending application of Charles P. Warman and Jack W. Moss, as set out above.

The present clutches are fluid cooled and are of the general character illustrated in FIG. 6 and further described in the co-pending applications of Charles P. Warman and, Charles P. Warman and Jack W. Moss, above mentioned, and are designed to circulate water, or other fluid, through conduit 72 into the stationary portion of rotary fluid seal 76, which is channeled to pass fluid therethrough into an axial element which has passages therein, and into distributor ring 70, thence out through conduits 78 and 80 to direct water into and through the passages within clutch 46 and outward therefrom to maintain the wear plates 62 therein sufficiently cool, so that the clutch may be slipped continuously, while maintaining the wear plates 62 engaged with the friction elements 64 on clutch plate 58, with the fluid passing through the passages within the clutch 46, the water or cooling fluid will be discharged into conduits 82 and 84 to be returned to the distributor ring 70, which rotated with the clutch, thence into passages which connect with rotary fluid seal 76, which will permit the fluid to pass outward into conduit 86 into a suitable circulating system for cooling the fluid for reuse.

The winch 52 is connected with the "out-haul" line 16, which "out-haul" line passes over a sheave 102 on mast 98 and over a sheave 104 on upright standard 26, so, as the trolley 22 and load 24 are moved outward from ship 18, the "in-haul" cable or line 14, attached to the opposite side of the trolley 22, is unwound from winch drum 54, with a constant tension being exerted on the line 14 in such manner that the cable tends to be wound thereonto, so as constant tension will be maintained on the "in-haul" line 14, as the trolley 16 is moved outward by a greater constant tension being maintained thereon, due to a predetermined air pressure being impressed on the clutch 46 in accordance with the setting of the tension sensing control unit 88, which unit supplies air from air supply line 90 to cable tension sensing control unit 88, and therethrough at the pressure determined by cable tension sensing device 92 on cable 16. The cable tension sensing device is connected, through air control sensing lines 94, in a manner as disclosed in the above designated application for patent of Charles P. Warman and Jack W. Moss, and the operation is more fully disclosed in the above mentioned patent to Art I. Robinson. The cable sensing device 92 is maintained against outward or inward movement by a universally mounted anchor arm 96 which is connected to the upright mast 98 and to the cable tension sensing device 92, and is maintained against outward or inward movement by the universally mounted anchor arm 96, which will enable the cable 16 to be swayed from side to side, and to move up and down, but all the while, operating effectively and efficiently.

The support cable 12 passes over a sheave 100 on the mast 98 and extends to the anchor member 28 on the upright standard 26. The arrangement as shown in FIGS. 1, 3 and 4, shows the load support cable 12 intermediate the "out-haul" cable 16 and the "in-haul" cable 14. The "out-haul" cable 16 passes over the sheave 102 and over sheaves 104 and 106 and is anchored to a side of trolley 22, with the "in-haul" cable 14 being anchored to the opposite side of the trolley 22 and passing over a sheave 108, which cable extends downwardly therefrom and is wound onto the drum of winch 54.

The support cable 12 has a cable tension sensing device 110 mounted thereon, to which device 110 air lines 112 are connected. The air lines pass downward and lead to cable tension sensing control unit 114 which controls the pressure from air supply line 90 into air line 116 which leads to the stationary portion of rotary fluid seal 118 and clutch 50. A cable tension sensing device 120 is associated with the "in-haul" line 14 and has air lines 122 connected therewith, which air lines connect with cable tension sensing control unit 124. The cable tension sensing control unit 124 has an air supply line 90 connected thereto to supply air to cable tension sensing device 124 through lines 122 which cable tension sensing control device 120 regulates the air pressure to air line 126 which leads from the air sensing control unit 124 and to the stationary portion of the rotary fluid seal 128. This arrangement enables air to be directed therethrough and into clutch 48 to impress pressure upon the expansible element within the clutch to exert the correct pressure upon the wear plates to cause the clutch to exert a predeterminted tension as pre-set on the cable tension control unit 124. Each of the cable sensing control units 88, 114 and 124 have a manually controlled regulating element thereon to pre-set the pressure to be applied to the respective cluthes with which they are connected so the clutches will each exert a torque in accordance with the setting of the respective cable tension sensing devices and the respective cable tension sensing control units.

If it is desired to move the load, such as indicated at 24, from ship 18 to ship 20, and with the support line 12 properly tensioned, the regulator element on cable sensing control unit 88 is set at a pressure to exert a greater torque, due to pressure on the friction elements than the regulator element, on cable sensing control unit 124 which will cause the clutch 46 to engage to such extent that the "out-haul" cable 16 will be wound onto the drum of the winch 52 to which the clutch 46 is connected, and the "in-haul" line 14 will be payed out from the drum of winch 52 as the clutch 48 will be set to slip to deliver less tension than the clutch 46, however, tension may be accurately controlled, so when the trolley 22 and load 24 reach the destination, greater tension may be applied to both the "in-haul" and the "out-haul" cables, which will cause movement of the trolley 22 to cease, thereby to enable the load 24 to be removed therefrom.

With the arrangement described above, ships may be moved parallel to each other, they may converge or diverge or the waves may cause the ships to rock or roll in opposite directions, or in the same direction, with a constant tension being maintained on each of the lines in accordance with the respective settings of the cable tension sensing control units 88, 124, while the cables 16 and 14 are being sensed for tension by the respective cable tension sensing devices 92 and 120.

When it is desired to move the trolley 22 from ship 20 to ship 18, the cable sensing control unit 114 is set to direct a greater pressure from air supply line 90 into air line 126 so as to cause the clutch 48 to engage to a predetermined degree to rotate winch drum 54 to wind the cable 14 thereonto with the cable sensing control unit 88 being so adjusted that the cable tension sensing device 92 will maintain "out-haul" cable 16 at a lesser tension so as to permit slippage of clutch elements within clutch 46 to permit the cable to be reeled off the drum of winch 52. In this manner all cables are automatically maintained at the desired constant tension, including the support cable, and the ships are free to maneuver within the length of the cables, without dropping the load into the water and without breaking the cables extending between the ships, or damaging the cargo or load as it is being loaded onto the trolley to be conveyed to the other ship or while it is being unloaded from the trolley onto the receiving ship.

The present device is particularly adaptable for the transfer of material between ships at sea, or from ship to shore or vice versa, or between two elevated points where cables must be maintained at constant tension for the safety of the cargo and for the safety of ship and/or dock personnel.

MODIFIED FORM OF INVENTION

The form of the invention as shown in FIG. 2 utilizes an upright standard 226 which is held in upright position by guy lines 230 secured to anchors 232 and to the upright standard and an upright mast 298, which may either be in a stationary location or on a ship or ships, with a winching mechanism designated generally at 210, which is mounted on a trailer or base 208, which base may be either portable or stationary.

An "out-haul" line 216 extends from a winch 252 and over sheave 302 on upright mast 298 and over sheave 304 on upright standard 226. The upper reach of the "out-haul" line 216 serves as a support line for trolley 222. The "out-haul" line 216 passes around sheave 306 and connects to a side of the trolley 222 opposite the "in-haul" line 214, with the "in-haul" line passing over sheave 308 and being wound onto the drum of winch 254.

The "out-haul" line 216 has a cable tension sensing device 292 thereon, which is of the character shown in FIG. 5, and the "in-haul" line has a similar cable tension sensing device 320 thereon, so as to enable the respective cables to be maintained at a predetermined, constant tension in accordance with the setting of a cable tension sensing control unit 88 and a cable tension sensing control unit 124, as disclosed in FIG. 4 of the drawings, and as more specifically brought out in the above mentioned patent to Art I. Robinson.

The load 224 may be moved between the upright mast 298 and the upright standard 226 by creating greater tension on either the "out-haul" line or the "in-haul" line with respect to the other of the lines, in the manner as set out in the above described form the invention, taken with the applications, as set out above, and the patent to Art I. Robinson, No. 3,289,967.

While the invention has been described in two embodiments thereof, it is to be understood that changes may be made in the minor details of construction, and adaptations made for different installations, without departing from the spirit of the invention or the scope of the appended claims.

Having thus clearly shown and described the invention, what is claimed as new and desired to be secured by Letters Patent is:

1. The method of transferring a load carrying trolley, which trolley is supported on a cable between two elevated stations, one of said stations being a supply station and the other of said stations being a receiver station, said trolley being attached to a cable which extends from an "in-haul" winch associated with the supply station, with a further cable attached to the trolley and around a sheave on the receiver station and attached to an "out-haul" winch associated with the supply station, said method comprising:
    (a) operating said winches at speeds and in directions operable to move the trolley from the supply station while slipping a clutch on at least one of the winches while maintaining a constant tension on the "in-haul" and the "out-haul" cables,
    (b) regulating the slippage of the respective clutches of the "in-haul" and "out-haul" winches by continuously sensing the tension of the "in-haul" and the "out-haul" cables,
    (c) selectively creating a greater tension on one of said cables to control the direction of movement of said trolley relative to one of said stations, and
    (d) controlling the slippage of the clutches to direct the stopping of the rolley relative to one said selected station.

2. A method of transferring a load carrying trolley, which trolley is supported on a cable between two elevated stations, as defined in claim 1; wherein
    (a) at least one of said stations is relatively movable with respect to the other of said stations.

3. A method of transferring a load carrying trolley, which trolley is supported on a cable between two elevated stations, as defined in claim 1; where
    (a) each said station is movable.

4. A method of transferring a load carrying trolley, which trolley is supported on a cable between two elevated stations, as defined in claim 1; wherein
    (a) said clutches each having fluid passages formed therein for passage of fluid therethrough, and
    (b) conduits connected to said fluid passages in said clutch to pass cooling fluid thereinto and therethrough to constantly cool the interengaging parts of the clutches to permit the clutches to slip continuously over an indefinite period of time.

5. An apparatus for transferring a load between laterally spaced apart, elevated stations, which apparatus comprises;
    (a) at least a pair of winches associated with one said station,
    (b) at least one sheave supported at an elevated position on the other of said stations,
    (c) a trolley support cable associated with said stations and passing over an elevated sheave on one of said stations and being wound on one of said winches, on the other of said stations,
    (d) a tralley mounted on said support cable to support said load during transfer,
    (e) a clutch associated with said winch to continuously slip to maintain said trolley support line at a pre-set constant tension,
        (1) said clutch having fluid passages formed therethrough,
        (2) conduits connected to said fluid passages in said clutch to pass a cooling fluid thereinto and therethrough to continuously cool said clutch,
    (f) an "in-haul" cable connected to one side of said trolley and to one of said winches to move said trolley toward one of said stations, and an "out-haul" cable connected to one of said winches and passing over said sheave of the other of said stations to move said trolley on said support cable,
        (1) cable tension sensing means associated with each said "out-haul" and "in-haul" cables to sense the tension thereof,
        (2) automatic control means associated with said cable tension sensing means to control the degree of engagement of the interengaging portions of the respective clutches, and
    (g) continuously slipping clutch means on said "out-haul" winch to maintain said "out-haul" cable at a constant, predetermined tension.

6. An apparatus for transferring a load between laterally, spaced apart, elevated stations, as defined in claim 5; wherein
    (a) at least three winches are associated with one said station,
    (b) cable tension sensing means associated with said support cable to sense the tension thereof,
    (c) automatic control means associated with said cable tension sensing means of said support cable to control the degree of engagement of the interengaging portions of the clutch connected with said winch on which said trolley support cable is wound to permit the clutch connected with said winch on which said support cable is wound, to slip continuously,
        (1) said clutch having fluid passages formed therein, and
        (2) conduits connected to said fluid passages in said clutch to pass a cooling fluid thereinto and therethrough to continuously cool said clutch.

7. An apparatus for transferring a load between laterally, spaced apart, elevated stations, which apparatus comprises;
    (a) a first drive member adapted to be connected to a source of power,
    (b) a first driven member, including a first winch drum,
    (c) connecting means interconnecting said first drive member and said first driven member in driving relation,
    (d) a first clutch, which clutch is capable of being slipped continuously, interposed between said first drive member and said first driven member in clutching relation,
    (e) a second drive member adapted to be connected with the source of power,
    (f) a second driven member, including a second winch drum,
    (g) connecting means interconnecting said second drive member and said second driven member in driving relation,
    (h) a second clutch, which clutch is capable of being slipped continuously, interposed between said second drive member and said second driven member in clutching relation, (i) variable controller means to control the degree of engagement of the respective interengaging portions of each said clutch, interposed between the respective drive and driven members,
(j) fluid passages formed within each said clutch,
   (1) conduit means connected with said passages of the respective clutches to direct cooling fluid into each said clutch, therethrough and from each said clutch, while said clutches are rotating, to cool the respective clutches to permit continuous slipping thereof without damage thereto by the heat generated therein,
(k) a cable wound on the drum of each said winch,
(l) at least one sheave on each said elevated station,
(m) a cable adapted to extend between said elevated stations,
(n) a trolley adapted to be supported on said cable,
(o) a cable passing over each of said sheaves and being secured to said trolley to move said trolley along said support cable, and
(p) cable tension sensing means associated with each of said cables, operatively attached to said trolley, to actuate said variable controller means to control the degree of tension of said cables.

8. An apparatus for transferring a load between laterally, spaced apart, elevated stations as defined in claim 7; wherein
(a) said variable controller means is manually operated to control the fluid pressure to each said clutch to control the degree of engagement between the drive and driven members thereof.

References Cited
UNITED STATES PATENTS 3,217,660 11/1965 Shillinger et al. _____ 104—114
3,361,080 1/1968 Born et al. _____ 104—114

TRYGVE M. BLIX, Primary Examiner

U.S. Cl. X.R.
254—172